Aug. 21, 1928.                                               1,681,625
               W. O. ROBERTS ET AL
                    INSECT TRAP
               Filed May 18, 1926          4 Sheets-Sheet  4
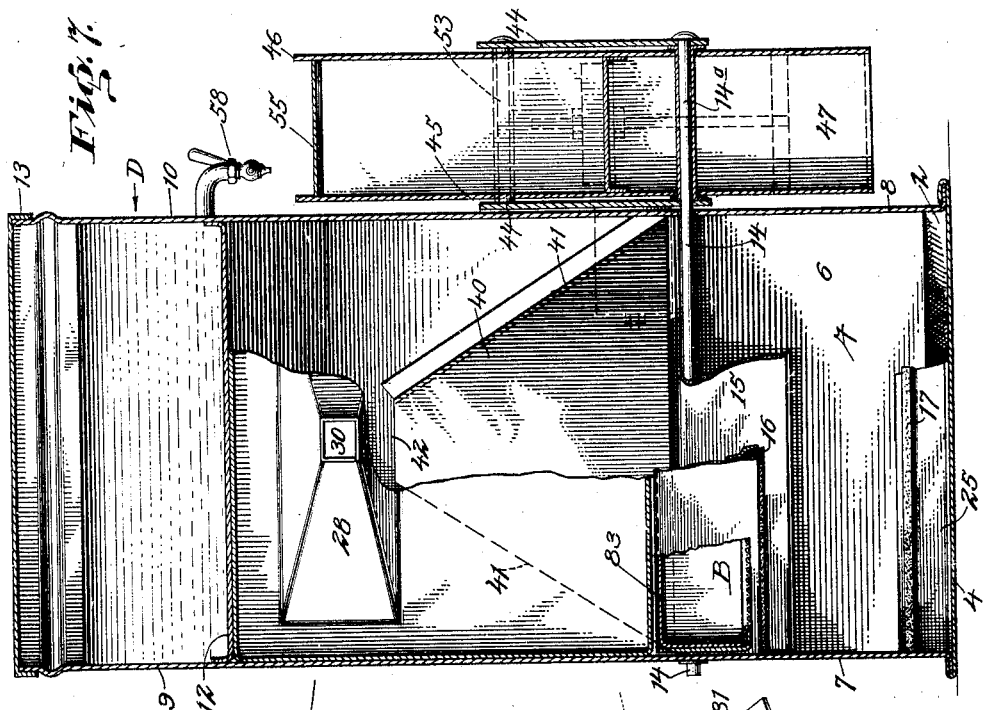
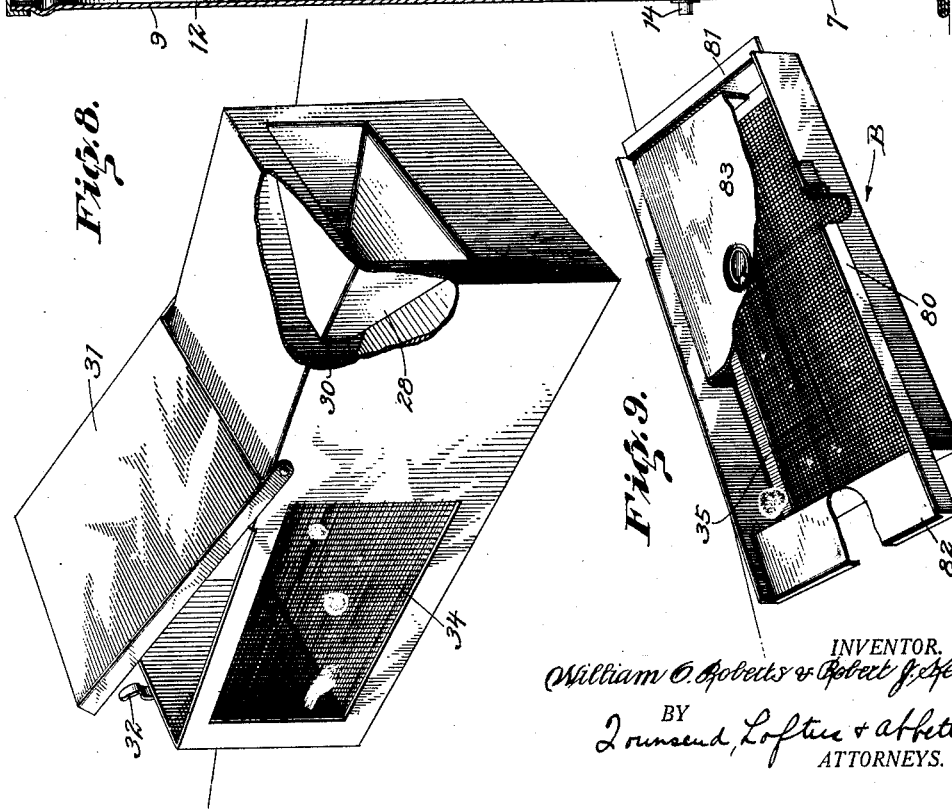
INVENTOR.
William O. Roberts & Robert J. Sears
BY
Townsend, Loftus & Abbett
ATTORNEYS.

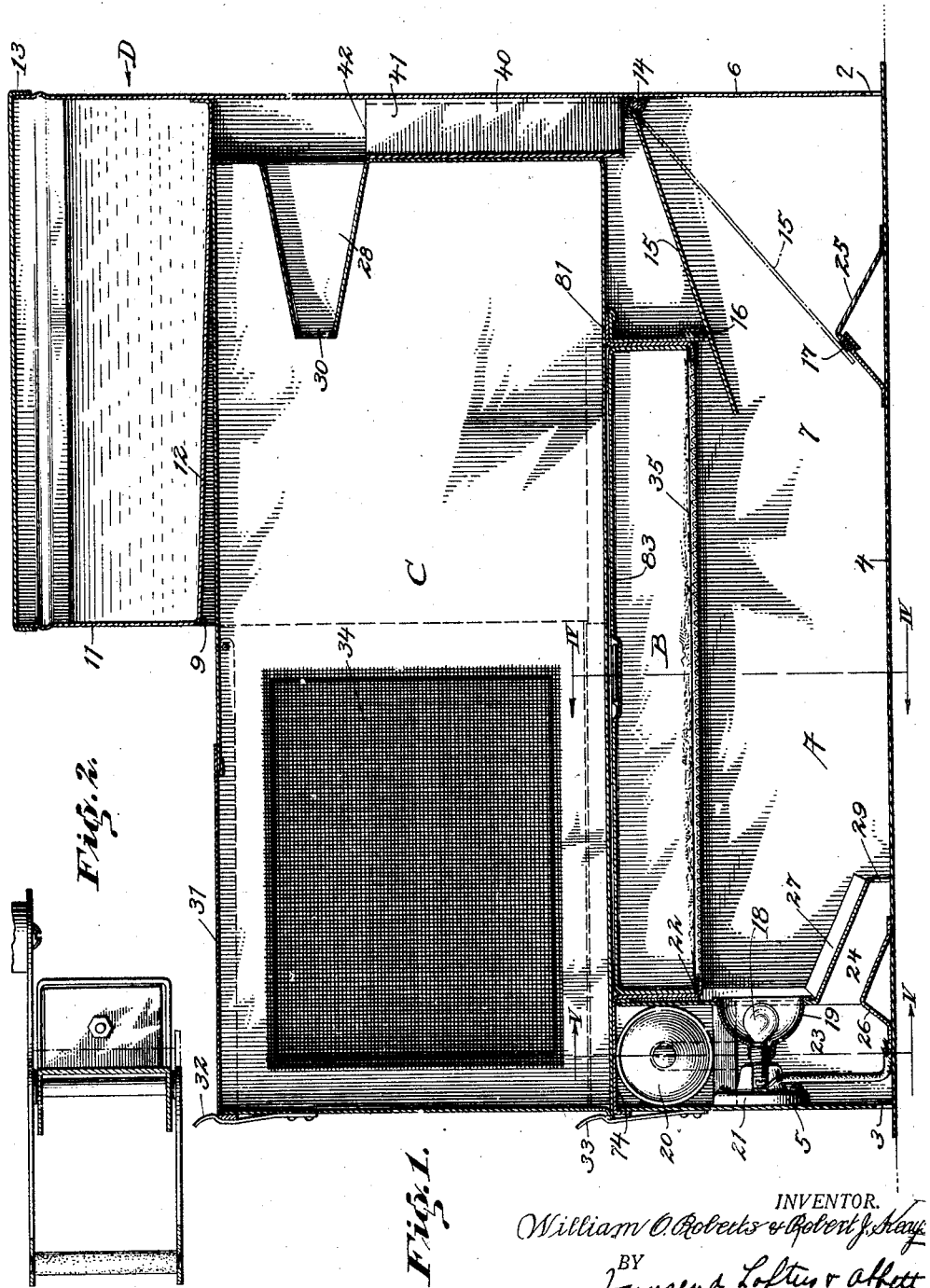

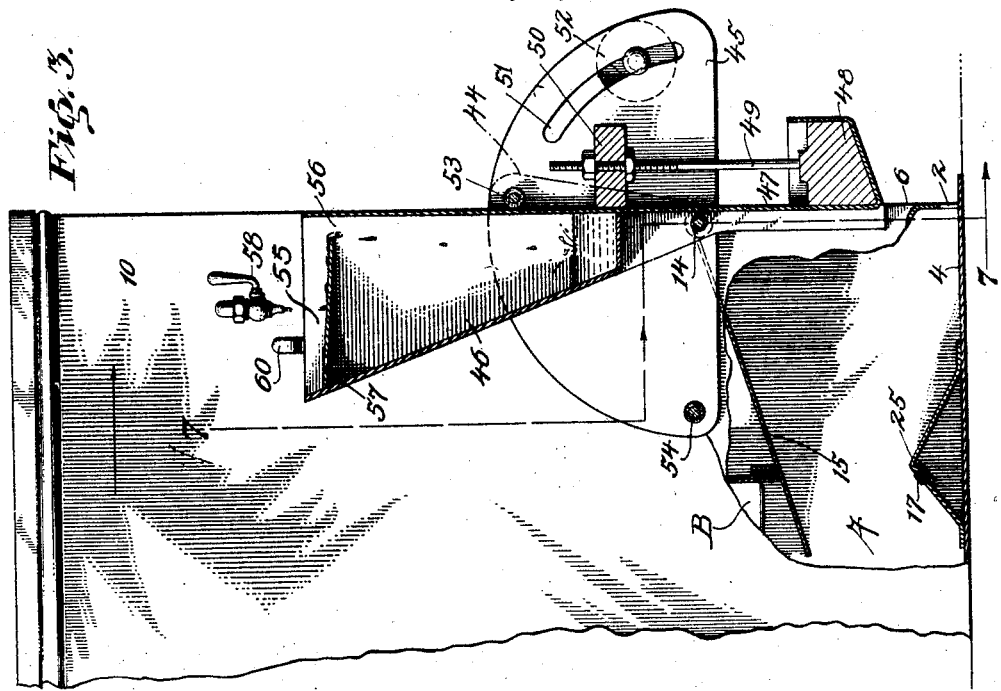
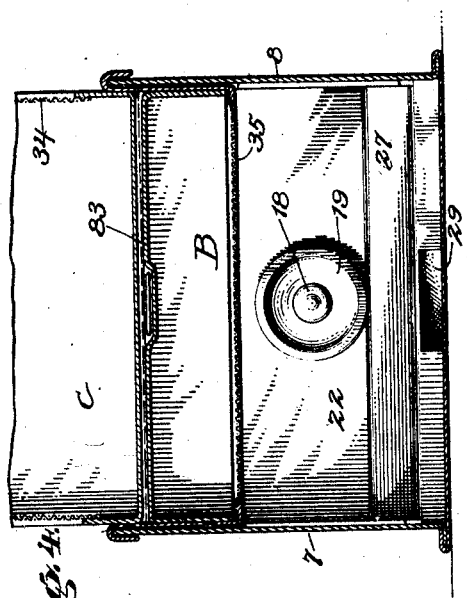
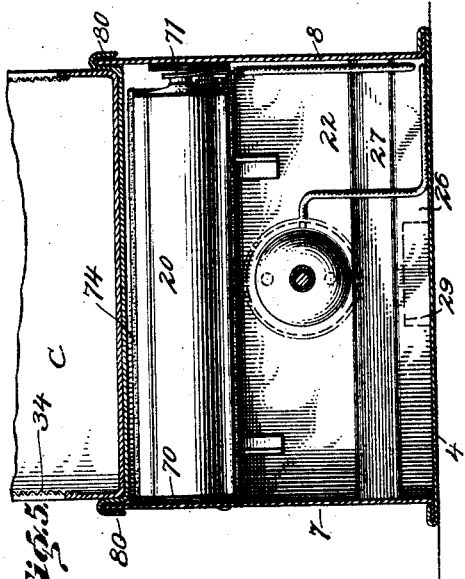

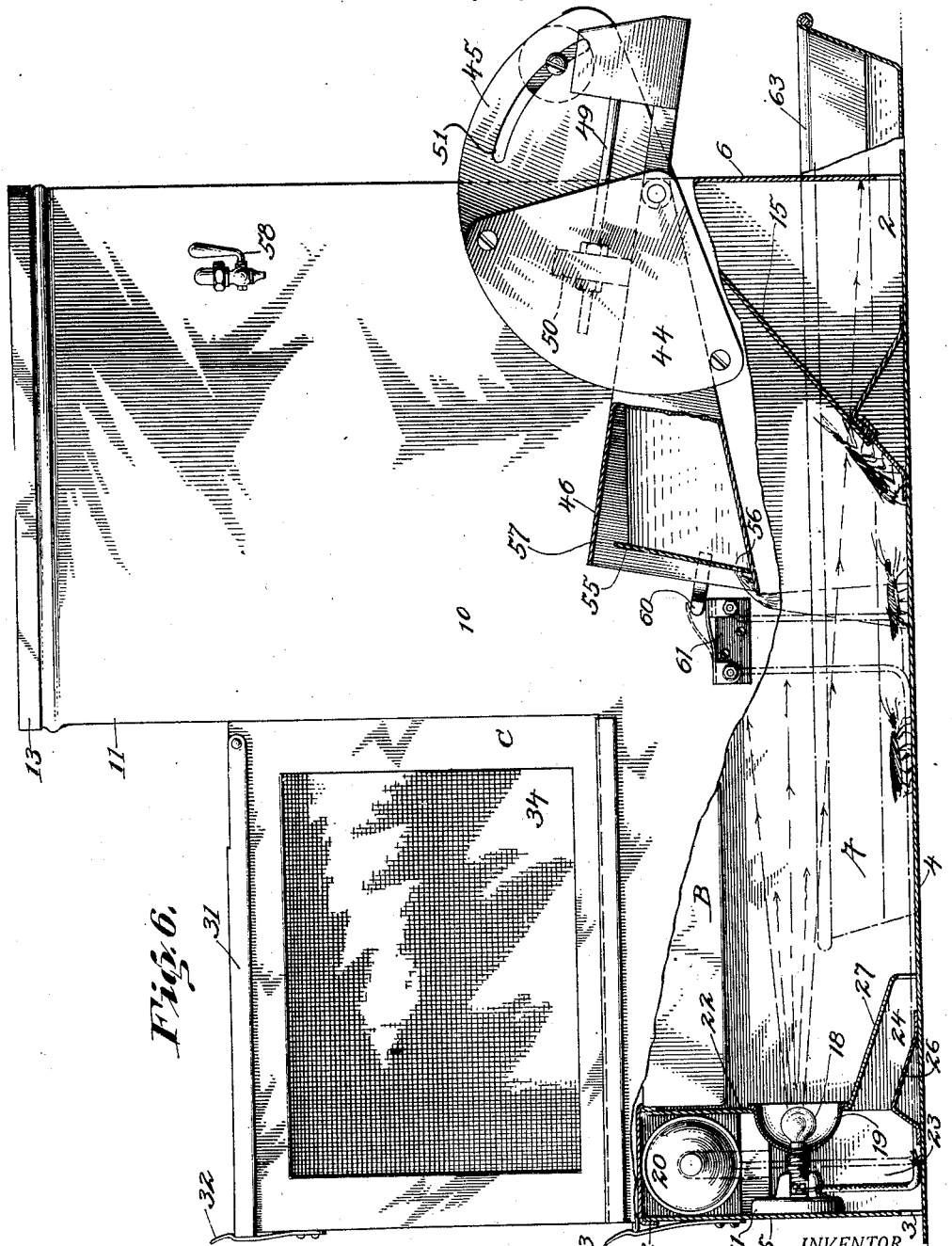

Patented Aug. 21, 1928.

1,681,625

UNITED STATES PATENT OFFICE.

WILLIAM O. ROBERTS, OF HOUSTON, TEXAS, AND ROBERT J. KEAYS, OF SAN FRANCISCO, CALIFORNIA.

INSECT TRAP.

Application filed May 18, 1926. Serial No. 109,877.

This invention relates to an insect trap, and especially to a trap for catching cockroaches and the like.

The object of the present invention is to generally improve and simplify the construction and operation of traps of the character described; to provide a trap which is mechanical and automatic in operation; to provide a trap into which the cockroaches are intermittently driven and where they may accumulate in considerable numbers; and further, to provide a trap from which the cockroaches may be readily removed from time to time and destroyed.

The invention is shown by way of illustration in the accompanying drawings, in which—

Fig. 1 is a central, vertical, longitudinal section of the trap.

Fig. 2 is a detail sectional view of the motor.

Fig. 3 is a side elevation partially in section of one end of the trap, said view particularly illustrating the motor.

Fig. 4 is a cross-section, taken on line 4—4 of Fig. 1.

Fig. 5 is a cross-section, taken on line 5—5 of Fig. 1.

Fig. 6 is a side elevation of the trap partly broken away and partly in section, showing the motor in discharging position and the trap door in closed position.

Fig. 7 is a vertical cross-section, taken on line 7—7 of Fig. 3.

Fig. 8 is a perspective view of the trap box, said view being partly broken away to show the entrance opening.

Fig. 9 is a perspective view of the bait tray, said view being partly broken away to show the detail construction of the same.

Referring to the drawings in detail, and particularly to Figs. 1, 3 and 6, it might be stated that the trap as a whole is preferably constructed of sheet metal or like material. It consists of a casing constructed of such material in which is formed an entrance chamber A into which the cockroaches enter from opposite ends through openings indicated at 2 and 3. Supported in the upper portion of the chamber A is a baited tray B. Supported on top of the bait tray is a trap box C, and disposed above the trap box is a water tank D, the function of which will later be described.

The chamber A is provided with a bottom or base section 4, end sections 5 and 6, and side sections 7 and 8. The side sections are extended upwardly at one end of the trap, as indicated at 9 and 10. These side sections also form the sides of the tank D. The end section 6 forms one end of the tank. A cross-piece 11 forms the opposite end of the tank, and a bottom member 12 forms the bottom of the tank, the tank being otherwise provided with a removable cover 13 to permit the tank to be filled from time to time.

Extending through the side sections 7 and 8 is a shaft 14, and secured on said shaft between the side walls 7 and 8 is a trap door 15 which is intermittently opened and closed, as will hereinafter be described. The trap door is shown in its open position in Figs. 1 and 3, and in its closed position in Fig. 6. rubber bumpers being provided at 16 and 17 to make the operation of the door as silent as possible when it is opened and closed.

Disposed at the opposite end of the chamber A are an incandescent bulb 18 and a cooperating reflector 19, and disposed above the bulb, or at any convenient point, is a dry battery 20 from which the bulb is intermittently actuated. A socket 21 supporting the bulb and the reflector is secured to the end wall 5 of the casing. An intermediate end wall 22 is employed and the reflector projects therethrough. A chamber 23 is formed between the walls 5 and 22 and the cockroaches enter this chamber through the opening 3. They then pass through a passage 24 and from there enter the main chamber A. The cockroaches also enter through the opposite opening 2 and then climb over an incline 25 with which the trap door 15 cooperates before reaching the main chamber. The passage 24 has an incline, such as shown at 26, and it is covered by a plate 27, which is also inclined. The side walls of the passages preferably converge in a manner similar to the side walls 28 of the entrance member shown in Fig. 8 and as such terminate in a small opening 29 through which the cockroaches must pass before finally entering the chamber, the opening 29 being perhaps best illustrated in Fig. 4.

The trap box is rectangular in shape, as shown in Fig. 8, and it is provided with an entrance member such as shown at 28, which terminates in a small opening 30, and it is also provided with a hinge cover 31 which is normally secured in closed position by a spring latch 32.

The trap box is supported on top of the chamber A, as shown in Fig. 1, and it is there secured by a bottom latch 33. As this latch is the only member which secures it, it may be readily removed or replaced as occasion may demand. The sides of the box may be provided with screened openings 34 and the number of cockroaches caught or trapped may thus be readily determined.

The cockroaches are attracted by the smell of the bait contained in the tray B and as such enter the chamber A through the openings 2 and 3. The bottom of the tray is constructed of a screen material, such as shown at 35, and permanent bait may thus be employed, as the cockroaches do not have access to the bait and as such cannot consume it.

One of the features of the present invention is to automatically close the entrance chamber A at predetermined time intervals, and then to frighten or drive the cockroaches from the chamber up into the trap box C. This is accomplished by closing the trap door 15 and turning on the light or bulb 18. Cockroaches do not like light and in fact are frightened the moment the chamber A is suddenly illuminated, and they immediately attempt to escape. They cannot escape through the opening 2, as the trap door 15 has been closed, and while they could escape through the openings 29 and 24, the opening 29 is so small that comparatively few, if any, would escape in that direction. In fact, the source of light is in that end of the chamber and the cockroaches are accordingly driven to the opposite end of the chamber, where they crawl up the inclined surface of the trap door. They then crawl up a passage indicated at 40, which is in communication with the entrance member 28 of the trap box. The further they crawl away from the chamber A, the darker it gets, and as the trap box is completely dark they pass through the opening 30 and drop into the trap box, where they are caught.

The passage 40 is formed between the end of the trap box and the end 6 of the housing. The passage is provided with tapering side walls, such as shown at 41 in Fig. 7, and as these taper a comparatively small exit is provided at 42. This exit is in communication with the entrance member 28 and as this in turn has a comparatively small exit 30 into the trap chamber, it is obvious that very few cockroaches will crawl out from the trap and return to the chamber A.

The mechanism whereby the trap door is automatically opened and closed, and whereby a circuit is automatically opened and closed through the bulb 18 will now be described.

The shaft 14 carrying the trap door is extended a considerable distance through the side wall 8. Secured on the extended portion 14$^a$ of the shaft is a pair of segmental-shaped plates 44 and 45. (See Figs. 3, 6 and 7.) Pivotally mounted on the shaft between the segmental plates is a bucket 46. Forming an extension on the lower end of the bucket is a plate 47, and carried by the lower end thereof is a weight 48, which in turn carries an upwardly extending rod 49 and an adjustable weight 50. The plate 45 is provided with a segmental slot 51 and this carries an adjustable counterweight 52. Extending between the segmental plates are two pins 53 and 54. The counterweights 48 and 50, which swing in unison with the bucket 46, normally retain the bucket in the upright or vertical position shown in Fig. 3.

The bucket is adapted to be filled with water and when so filled, it overbalances the weights 48 and 50 and assumes the tilted or discharging position shown in Fig. 6. The upper end of the bucket is provided with a cover plate 55. This cover is slightly inclined, as shown in Fig. 3, and it is provided with two openings 56 and 57. A drip valve 58, which is in communication with the water tank D, is mounted above the cover section of the bucket and it is so regulated that the water discharges from the tank comparatively slowly; for instance, drop by drop. The drops of water striking the cover run down the inclined surface thereof and enter the bucket through the opening 56. The water gradually accumulates until the bucket is filled, or to a point where the weight of the water overcomes the weight of the counterbalancing members 48 and 50. The bucket then swings away from the pin 53 and strikes the pin 54. When the weight of the bucket strikes the pin 54, a turning movement is imparted to the segmental plates 44 and 45, and as these are secured to the shaft 14, as is also the trap, the shaft will rotate and the trap door will be closed, this position of the mechanism being shown in Fig. 6. The water in the bucket will then discharge through the opening 57 and this opening is so small that a predetermined time interval will lapse before the water discharges. The trap door thus remains closed during this period, and as the light is turned on during this period, the cockroaches will be driven out of the chamber and upwardly through the passage 40, from where they enter the trap box.

The upper end of the bucket is provided with a lug 60. This lug engages a spring contact or switch 61, when the bucket assumes the position shown in Fig. 6, and this switch closes a circuit through the battery and the light 18. The moment the water is discharged, the weight of the counterbalance 48 returns the bucket to upright position. It thus strikes the pin 53 disposed between the plates 44 and 45 and the segments, together with the trap door and the shaft, are returned to normal position, as shown in Fig. 3.

The drip feed from the valve 58 is continuous and the bucket will thus remain in an upright position for a predetermined time interval before it is again filled and automatically overbalanced to swing back to discharge position. It here remains a predetermined time interval, and it is again automatically returned, the cycle of operation being repeated and repeated until the tank D is empty. The tank may, of course, have a considerable capacity, at least sufficient to run for one day, when it may be refilled.

The water from the bucket may discharge into a pan 63 disposed on one side of the trap box, or suitable connections may be made with a sewer to take care of the discharge.

When the cockroaches have accumulated in the trap chamber in a sufficient quantity, latch 33 is released and the trap box removed, the insects being then destroyed by drowning, burning, or as the operator may choose. The trap box is then returned and placed in position and if the water tank is filled, the trap is again in condition for operation.

The dry battery by which the bulb is operated is contained in the upper part of the intermediate chamber 23. Contacts 70 and 71 are provided at opposite ends, which are connected with the bulb and switch 61, contact 70 being preferably grounded to the casing, and the contact 71 insulated therefrom so that the circuit is only established when the switch is closed. The switch is of the spring type and automatically opens and breaks a circuit when the bucket returns to vertical position. A cover 74 is placed above the battery and when this is removed, it is a simple matter to replace the battery when run down.

The bait trap B is preferably constructed as shown in Fig. 9. It is provided with hook-shaped side flanges 80 and end flanges 81 and 82. It is thus supported by the side and end sections of the main casing and as such may be readily removed from time to time, if it is desired to renew the bait. The bait tray is also provided with a removable cover section 83.

It should be noted that overhanging flanges are provided at practically all joints or connections so as to prevent escape of light from the casing which might have a tendency to frighten away approaching cockroaches. The structure is also so arranged that no light will escape through the entrance openings 2 and 3 and that is the reason why the inclines 25 and 26 are provided. They are of such height that none of the light rays will project through the openings 2 and 3.

The trap as a whole is a simple and substantial in construction. The trap box and the bait tray may be readily removed from time to time; the tank is easily refilled; the battery may be replaced at any time, and as the rest of the mechanism is automatic in operation, practically no care is required on the part of the operator.

The cockroaches are, practically speaking, continuously entering the main chamber A, and they are intermittently frightened or driven out of the chamber and up into the trap chamber. Accumulation of cockroaches in the entrance chamber, where they are attracted by the smell of the bait, is thus prevented, and as the capacity of the trap box is comparatively great, large numbers of cockroaches may be caught and destroyed.

While certain features of the present invention are more or less specifically illustrated, we wish it understood that various changes in form and proportion may be resorted to within the scope of the appended claims. We similarly wish it understood that the materials and finish of the several parts employed may be such as the experience and judgment of the manufacturer may dictate or various uses may demand.

Having thus described our invention, what we claim and desire to secure by Letters Patent is—

1. A device of the character described comprising a casing having a chamber formed therein into which insects may enter through an entrance opening, means within the chamber to attract insects, a container provided with a trap chamber, means for intermittently and automatically closing the entrance opening, and means for lighting the chamber and for driving the insects into the trap chamber.

2. In a device of the character described, a casing having a chamber formed therein and an entrance opening into said chamber, a trap door, means within the chamber for attracting insects, a casing having a trap chamber formed therein, means for automatically closing the trap door to prevent escape of insects through the entrance opening, and means in one end of said chamber adapted to illuminate the chamber so as to drive the insects from the chamber into the trap chamber.

3. A device of the character described comprising a casing having a chamber formed therein and an entrance opening through which insects are adapted to enter, a bait tray within the chamber to attract insects, a normally open trap door cooperating with the entrance opening, an electric light in one end of the chamber, a trap box having a trap chamber formed therein and in communication with the first named chamber, and means for automatically closing the trap door to prevent escape of insects through the entrance opening, and for simultaneously closing a circuit through the electric light, said light illuminating the chamber and driving the insects therefrom into the trap box.

4. A device of the character described comprising a casing having a chamber formed therein and an entrance opening through which insects are adapted to enter, a bait tray within the chamber to attract insects, a normally open trap door cooperating with the entrance opening, an electric light in one end of the chamber, a trap box having a trap chamber formed therein and in communication with the first named chamber, a source of water supply, a water motor driven thereby, and means actuated by the motor for intermittently opening and closing the trap door, and for simultaneously opening and closing a circuit through the electric light.

WILLIAM O. ROBERTS.
ROBERT J. KEAYS.